July 15, 1952 D. J. BAKER 2,603,490

MOUNTING ARM FOR SOUND TRANSLATING DEVICE

Filed April 11, 1945 2 SHEETS--SHEET 1

Inventor
DONALD J. BAKER

By Ralph B. Stewart
Attorney

MOUNTING ARM FOR SOUND TRANSLATING DEVICE

Filed April 11, 1945 2 SHEETS--SHEET 2

Inventor
DONALD J. BAKER

By Ralph B. Stewart
Attorney

Patented July 15, 1952 2,603,490

UNITED STATES PATENT OFFICE 2,603,490

MOUNTING ARM FOR SOUND TRANSLATING DEVICE

Donald J. Baker, Los Angeles, Calif.

Application April 11, 1945, Serial No. 587,757

7 Claims. (Cl. 274—23)

This invention relates to a mounting arm of the type commonly referred to as a pickup arm or a tone arm for supporting a pickup head or other sound translating device in operative relation with a disk-type of sound record. While my mounting arm is especially suitable for supporting the pickup head of a sound reproducing machine, it will be obvious that the arm may be used for supporting a sound recorder or a sound-box or other sound translating device.

The main object of the invention is to devise a mounting arm for a sound translating device cooperating with a disk-type of record such that the fore-and-aft axis of the sound translating device remains substantially tangent to the sound groove on the record at the point where the stylus or needle engages the record. Stated more accurately, the vertical plane which includes the fore-and-aft axis of the sound translating device remains tangent to the groove at the point where the needle engages the record.

The many advantages which accrue from maintaining a tangent relation of the sound translating device with respect to the record groove have been stated very completely in a number of articles in the published literature dealing with the subject, and these advantages need not be repeated here.

Various arrangements have been proposed for securing an approximation of the tangent condition. Some of these arrangements are quite complicated and impractical while others have gone into extensive use. One arrangement commonly used involves a rigid tone arm pivoted on a vertical axis near the edge of the turntable and having the sound translating device mounted so that when the arm is moved to the center of the record the needle or stylus overhangs the record-centering pin by a certain amount, and the axis of the translating device is arranged at an angle to the line passing through the point of the needle and through the pivotal axis of the tone arm. This arrangement does not secure a tangent relation for all positions of the stylus on the record, but the axis of the translating device varies from the tangent relation according to the radial distance from the center of the record to the needle or stylus. This has been shown in an article by B. B. Bauer appearing in "Electronics" for March 1945. Also, such arrangements do not eliminate said groove wear.

In case of a rigid tone arm swinging about a fixed vertical axis, the amount of mistracking could be reduced materially by the use of a long arm, but limitations on space and weight of the arm make it necessary to use a relatively short arm where the fixed pivotal axis is located near the edge of the turntable.

My invention employs a rigid tone arm, but instead of mounting the arm to swing about a fixed pivital axis, the arm is mounted to swing about a vertical axis which also moves along a predetermined path during the swinging of the arm. The amount of movement of the pivotal axis of the arm along the path is controlled by a link which is pivoted at one end on a fixed vertical axis and has a pivotal connection with the tone arm at a point between its pivotal axis and the free end of the arm. The sound translating device is mounted on the end of the tone arm with its fore-and-aft axis inclined to the line passing through the point of the needle and the pivotal axis of the arm.

One embodiment of my invention is illustrated in the accompanying drawings in which Figure 1 is a plan view showing the tone arm mounted for cooperation with a record on a turntable;

Figures 1, 2, 3, 4, 5:
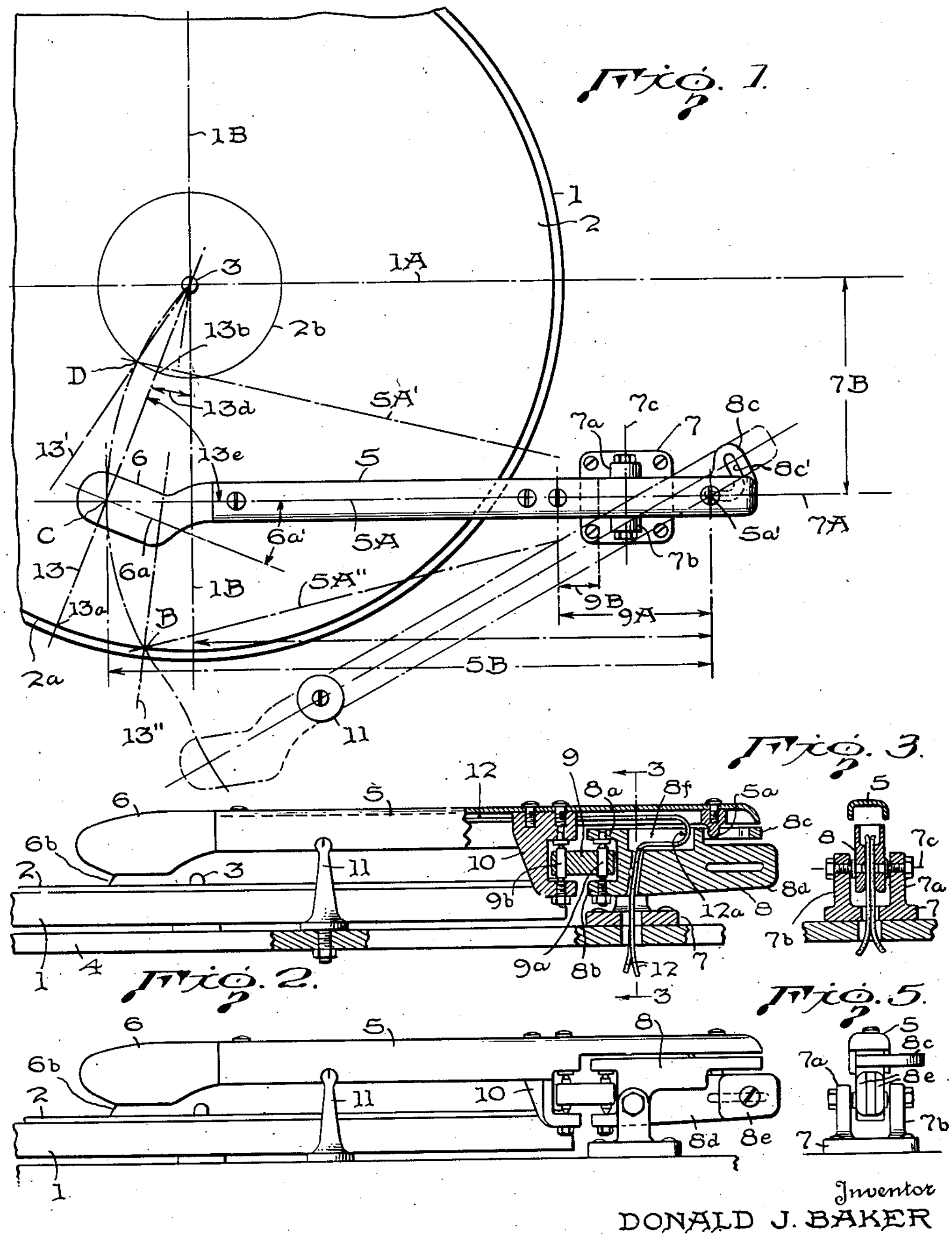
Figure 2 is an elevational view of Figure 1 with the rear end of the arm shown in section to illustrate the arrangement of the supporting structure.
Figure 3 is a sectional view of Figure 2 taken along the plane 3—3.
Figure 4 is a side elevational view of Figure 1.
Figure 5 is an end view of the tone arm as shown in Figure 4.

Referring to the drawing, a turntable 1 carries a disk record 2 which is centered on the table by centering pin 3, the turntable being supported by a suitable plate or board 4. The tone arm 5 is formed of a rigid member, preferably a hollow member having a cross-section of inverted U-shape. At the free end of the tone arm is mounted a pickup 6 or other sound translating device having its fore-and-aft axis 6*a* inclined to the axis of the arm 5 in the manner shown in Figure 1. The pickup has a needle or stylus 6*b* which engages the record preferably at the point of intersection of two vertical planes, one passing along the axis of arm 5 and the other including the axis 6*a* of the pickup 6.

The rear end of the tone arm is supported by means of a structure including a bracket 7 secured to the board 4 and having two vertical standards 7*a* and 7*b* between which a mounting block 8 is pivotally supported on a horizontal axis 7*c*. A link 9 is arranged beneath tone arm 5 in front of the block 8, and the rear end of this link is pivotally supported on a vertical axis between two parallel arm extensions 8a and 8b formed on the front end of block 8. The front end of link 9 is pivotally connected on a vertical axis with spaced abutments formed on bracket 10 secured to arm 5. As shown in Figure 2, the two pivotal mountings for link 9 are made by means of pivot pins 9a and 9b. By this type of mounting, the tone arm 5 swings about the horizontal axis 7c with block 8 when the arm is raised from the record.

The lower portion of the arm 5 at the rear end of the arm is cut away as shown in Figure 4 to permit the rear end of the arm to clear the upper face of the block 8. This block is provided with a horizontal tail piece 8c arranged under the extreme rear end of the arm 5 as shown in Figure 2 and which also extends to one side of the rear end of the arm as shown in Figure 1. This tail piece is provided with a slot 8c' which receives a guiding pin 5a which is mounted near the rear end of the arm 5 and extends into the slot 8c. As will be seen from Figure 1, the guiding slot 8c' has a straight portion which is in alignment with the axis of the arm 5 when in the position shown in solid lines in Figure 1. This straight portion of the slot is at right angles to the pivotal axis 7c of the block 8. The rear portion of the slot 8c' turns and goes off at an angle to one side of the axis of arm 5 as shown in Figure 1 and the purpose of this construction will be explained later. Block 8 is also provided with a vertical tail piece 8d at the rear end thereof which forms a support for a counterweight 8e which may be adjusted towards or away from the pivotal axis 7c.

A vertical bracket or standard 11 is mounted to one side of the turntable 1 and serves to support the tone arm 5 during changing of the record.

Connections to the pickup 6 are made by conductors 12 which pass from the pickup 6 back through the hollow arm 5 on opposite sides of the bracket 10 and then enter a cavity 8f formed in the upper face of block 8 and then pass downwardly through a vertical hole formed in block 8, and then through aligned vertical holes formed in the base of bracket 7 and supporting plate 4. The provision of a loop 12a in the conductors 12 within the cavity 8f avoids any undue interference with the movement of the tone arm.

The location of the mounting bracket 7 is determined in the following manner. The horizontal and vertical axes of the record are established at right angles to each other as shown at 1A and 1B in Figure 1. The longitudinal axis 7A of bracket 7 will be parallel with axis 1A as shown in Figure 1, and the distance 7B between this axis and the axis 1A is determined in the following manner. Assume that the angle 6a' between the axis 6a of the heads 6 and the axis 5A of the arm 5 is to be 22°; then a radial line 13 is drawn through the center of the record at an angle of 22° to the left of the lower part of the axis 1B. The outer boundary of the recording on the record is represented by the circle 2a while the inner boundary is shown by the circle 2b. The radial line 13 crosses these two circles at the points 13a and 13b, respectively. A point C is located midway between the points 13a and 13b, and the bracket axis 7A is drawn through this point parallel with axis 1A. For a twelve-inch record, the distance 7B will be in the neighborhood of three and one-half inches, assuming that the diameter of the central blank portion of the record is three inches and the outer diameter of the recording is twelve inches.

The point C indicates the point of engagement of the needle with the record when the tone arm is in the position shown in solid lines in Figure 1 where the axis 5A of the arm 5 is coincident with the bracket axis 7A, and the axis 6a of the head 6 is tangent to the groove at this point, since the angle 13d between the line 13 and axis 1B is equal to the angle 6a'.

The distance 5B from the point of the needle 6b back to the pin 5a may be selected at any convenient distance depending upon the space available. Assume this distance to be ten inches; then the point 5a' on the axes 5A and 7A will be located ten inches from the point C and the axis 5a' of pin 5a will remain at this constant distance from the needle 6b for all positions of the arm 5. Furthermore, the axis 5a' is to remain on the axis 7A for all operative positions of the arm. In order to maintain the tangent relation of the pickup head, it will be necessary to shift the axis 5a' along the axis 7A as the arm 5 moves across the record. The pin 5a is constrained to travel along the axis 7A by a portion of the groove 8c' which is formed coincident with the axis 7A.

It will be understood that in order to maintain the tangent relation of head 6 with respect to the groove, the radial line passing through the center of the record and the point of the needle must bear a constant angular relation to the axis 5A of the arm 5. This constant angle is indicated by the angle 13e in Figure 1. The point D at which the path of travel of the needle enters the blank portion of the record is determined by drawing a radial line 13' which intersects the circle 2b at point D and the angular position of line 13' is such that the distance between the point D and the point at which the arm axis 5A' intersects the axis 7A is equal to the distance 5B, and in the example assumed, this would be ten inches. It will be found that the point D is so located that the pin 5a has moved to the right so that its axis now occupies the position shown at 5a'' in Figure 6.

Figure 6:
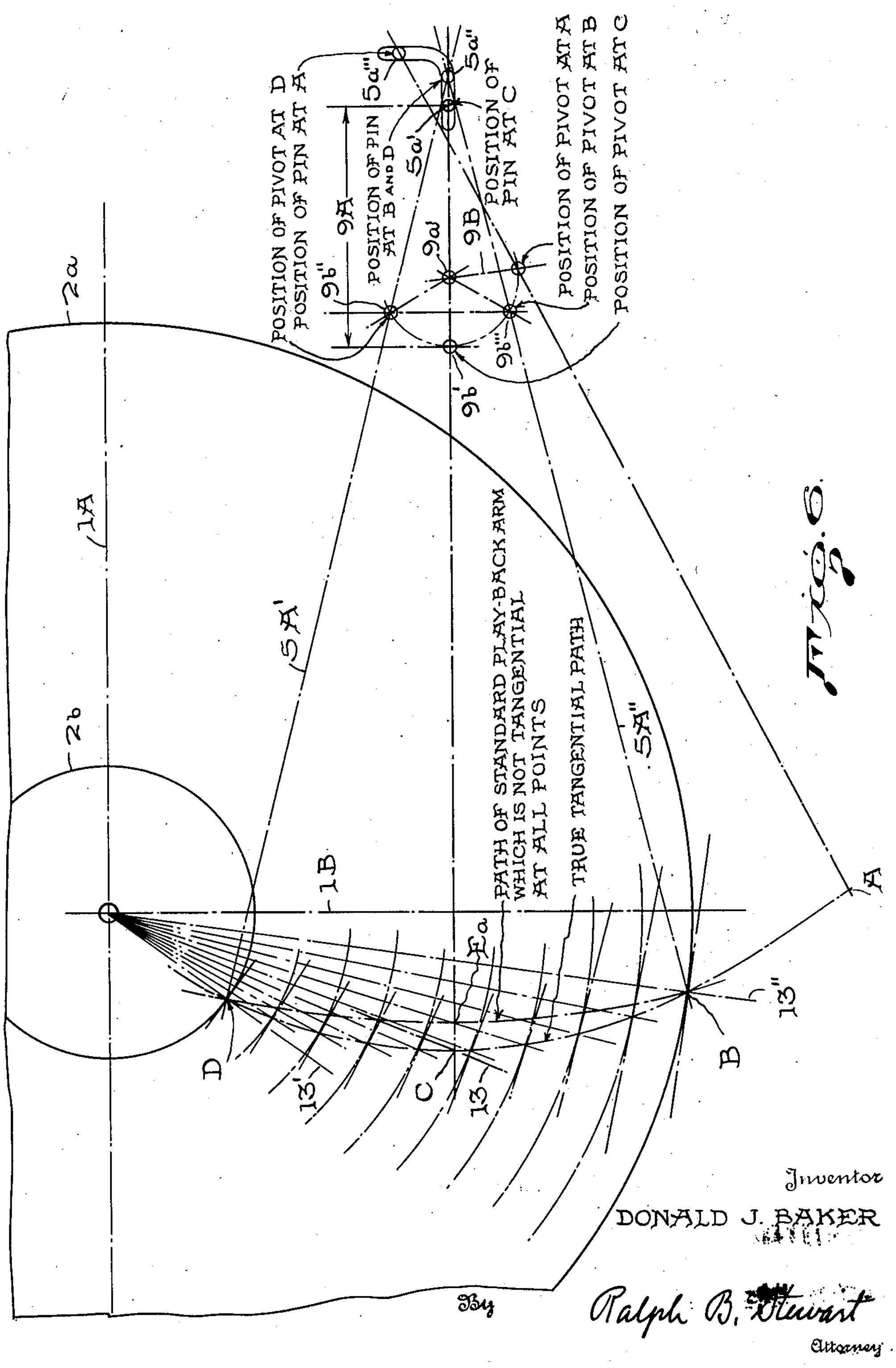
Figure 6 is a diagram illustrating the operation of the invention.

In a similar manner, the point B at which the needle crosses the circle 2a representing the outer boundary of the recording is located by establishing a radial line 13'' at an angular position such that the arm axis 5A'' intersects the axis 7A at the point 5a''. This is clearly shown in Figure 6. A dotted arc E is now drawn about the point 5a'' passing through the points B and D. In Figure 6 the dot-dash curved line T indicates the path of travel of the needle for the true tangent relation, and the distance between the point C and the point Ea at which the curve E intersects the axis 5A determines the maximum amount of shift of the axis of pin 5a along the axis 7A as the tone arm travels across the record. In other words, the distance between the points C and Ea is equal to the distance between the points 5a' and 5a'' in Figure 6.

In Figure 6 the points 9a' and 9b' indicate the locations of the axes of the pivot pins 9a and 9b, respectively, on link 9 when the arm axis 5A is coincident with the bracket axis 7A. The axis 9a' remains fixed, while the axis 9b' swings about the axis 9a'. The effective length of link 9, or the spacing between the axes of pivot pins 9a and 9b, is determined in the following manner. A point 9b' is placed on the axis 5A at a convenient location as shown by the distance 9A in Figure 6. Similar points 9b'' and 9b''' are placed on the lines 5A' and 5A'' at the same distance 9A from the point 5a''. A circle is now drawn through the three points 9b', 9b'' and 9b''' with the center of the circle located at 9a' on the axis 7A. The radius of this circle will be the effective length of link 9 and equal to the distance 9B in Figure 1.

From the foregoing it will be seen that a perfect tangent relation of the pickup head is obtained at at least three different positions of the head corresponding to the points B, C and D on the curve T. This marks a distinct improvement over prior arrangements using rigid tone arms where the paths of travel of the needle intersects the true tangent path at only two points. While the pickup head may depart from the true tangent relation to a small degree between the three points mentioned, the amount of deviation is very small and has no noticeable effect on the operation.

If the mounting arm were pivoted at the point 5a'', the path of movement of the needle would be along the dotted line E in Figure 6, and the pickup head would have a true tangent relation only at the points B and D where the curve E intersects the curve C. The greatest deviation from the tangent relation would be found at the middle of the grooved portion of the record, and this deviation would be indicated by the angle between the radial lines passing through the points C and Ea which in the example shown would be between 4 and 5°. According to my invention the angle of deviation is reduced to zero at the point C, and it is negligible for all other points in the path of travel of the needle.

Since the link 9 is of limited length, it would limit the amount of movement of the mounting arm away from the center of the record, and in order to allow the arm to be moved entirely clear of the record and turntable, for the purpose of changing records, I form the rear portion of the slot 8c' at an angle to the axis 7A. In Figure 1 the rear portion of the slot turns back at an angle greater than 90°, but this angle is not at all critical and it may be a right angle as shown in Figure 6. When the pin 5a enters the laterally extending portion of the slot, the arm 5 is allowed to pivot about the pivot pin 9b of the link 9, and this permits free movement of the arm beyond the edge of the turntable and into a position where it may rest upon the standard 11, as shown in the dotted line position in Figure 1. It will be understood that the pin 5a does not enter the laterally projecting portion of the slot until the needle has moved beyond the outer boundary of the curved portion of the record.

In Figure 6 the pin 5a occupies the position shown at 5a''' when the arm is moved to the position A.

From the foregoing it will be understood that my invention provides a mounting arm which is pivoted near one end so the arm will swing through a predetermined arc, and movement of the arm causes the pivotal axis of the arm to shift in a direction transversely of the arc through which the needle swings, or substantially parallel with the mid position of the line passing through the needle point and the pivotal axis of pin 5a.

By eliminating the over-hang in the stylus mounting and by maintaining the tangent relation throughout the path of travel of the stylus, my invention entirely eliminates the side groove wear which is present in prior devices.

It may be noted that the path of travel of the stylus over the grooved portion of the record and represented by the dot-dash line T in Figure 6 is a curve which if extended inwardly would pass through the center of the record.

In describing my invention I have given one example for use with a twelve-inch record, but the principles of my invention may be applied to records of other diameters. For larger records, such as a seventeen-inch record, the tone arm will be longer and the link 9 will also be longer than for a twelve-inch record.

I claim:

1. An arrangement for mounting a sound translating device comprising, in combination, a mounting block, means for mounting said block for movement about a fixed horizontal axis, a tone arm arranged transversely of said horizontal axis, means for connecting said arm for pivotal movement with said block about said horizontal axis comprising a link element pivotally connected at one end to said block on a vertical axis and pivotally connected at the other end to said arm on a second vertical axis and at a point intermediate the ends of said arm, one end of said arm having said translating device mounted thereon and the other end being located adjacent said block, and pivotal means interconnecting said other end of said arm and said block for constraining the horizontal movement of said arm about a vertical axis located adjacent said other end of said arm, said pivotal means being free to move along a path transversely of said horizontal axis.

2. An arrangement according to claim 1 wherein said pivotal means comprises a pin element carried by the rear end of said arm and having the end thereof positioned within a guiding slot formed in said mounting block substantially at right angles to said horizontal axis.

3. An arrangement for mounting a sound translating device for cooperation with a disk-type sound record comprising in combination, an arm having a longitudinal axis, means fixedly supporting said translating device in the free end of said arm so that there is an angle of constant value between the vertical planes passing through the longitudinal axis and the fore-and-aft axis of the sound translating device, respectively, pivot means near the other end of said arm providing a vertical pivotal axis about which said arm swings as said translating device traverses the grooved portion of the record, means mounting said pivot means for movement along a linear path which is substantially parallel to the longitudinal axis of the said arm when the free end of said arm is in mid position radially of the grooved portion of the record, and means controlled by the swinging of said arm about said vertical pivotal axis for shifting said pivot means along said linear path.

4. A mounting arrangement for a sound translating device comprising, in combination, an arm having a sound translating device fixed to the free end thereof, a stationary support, pivot means near the other end of said arm cooperating with said stationary support to mount said arm for movement about a vertical pivotal axis as said sound translating device traverses the grooved portion of a disk-type sound record, said pivotal means being constructed to permit movement of the vertical pivotal axis of said arm along a linear path which is substantially parallel to the longitudinal axis of the said arm when the free end of said arm is in mid position transversely of the grooved portion of the record, and means controlled by movement of said arm when it is at either side of said mid position for shifting the vertical pivotal axis of said arm along said linear path in a direction away from said translating device.

5. An arrangement for mounting a sound translating device comprising, in combination, a support, an arm having a free end, pivotal means provided on the other end of said arm for holding said arm on said support for directed movement about a vertical axis between two end positions forming an angle with respect to one another, said pivotal means being shiftable with respect to said support along a linear path substantially parallel with the longitudinal axis of said arm when the free end of said arm is in mid position between said two end positions, and means controlled by the horizontal movement of said arm about said vertical axis on either side of said mid position for shifting said pivotal means along said linear path in a direction away from the free end of said arm.

6. A mounting arrangement according to claim 5 wherein said last recited means comprises a link element having one end thereof pivoted on a fixed vertical axis, and means for pivotally connecting the free end of said link to said arm at a point intermediate the free end thereof and said pivotal means providing a vertical axis for said arm.

7. An arrangement for mounting a sound translating device for cooperation with a disk-type sound record comprising, in combination, an arm having said translating device fixed at the free end thereof, pivot means secured to said arm at a fixed distance from said translating device for mounting said arm for swinging movement over the grooved portion of said record, said pivot means being arranged for movement along a linear path substantially parallel to the longitudinal axis of the arm when the free end of the arm is in mid position radially of the grooved portion of the record and means connected to said arm at a point between said translating device and said pivot means for constraining the movement of the arm at said point to a circular arc having a center located on said linear path between said point and said pivot means.

DONALD J. BAKER.

REFERENCES CITED

The following references are of record in the file of this patent:

UNITED STATES PATENTS

| Number | Name | Date |
|---|---|---|
| 1,885,994 | Dieux | Nov. 1, 1932 |
| 1,963,673 | Patino | June 19, 1934 |
| 2,006,605 | Putnoky | July 2, 1935 |
| 2,025,300 | Mueller | Dec. 24, 1935 |
| 2,192,464 | Yasuda et al. | Mar. 5, 1940 |
| 2,303,619 | Davis | Dec. 1, 1942 |

FOREIGN PATENTS

| Number | Country | Date |
|---|---|---|
| 116,163 | Great Britain | June 6, 1918 |
| 289,984 | Great Britain | May 10, 1928 |
| 676,429 | France | Nov. 28, 1929 |
| 372,317 | Great Britain | Apr. 29, 1932 |
| 558,504 | Germany | Sept. 8, 1932 |
| 386,851 | Great Britain | Jan. 26, 1933 |